United States Patent Office 2,741,605
Patented Apr. 10, 1956

2,741,605

PHENOXAZINE COMPOUNDS AND THEIR p-NITROSOANILINE INTERMEDIATES

Frithjof Zwilgmeyer, Wilmington, Del., assignor to E. I. du Pont de Nemours and Company, Wilmington, Del., a corporation of Delaware No Drawing. Application August 27, 1954,
Serial No. 452,714

7 Claims. (Cl. 260—244)

This invention relates to novel phenoxazine compounds useful as dyes for polyacrylic textile fibers.

It is a principal object of this invention to provide economical, bright, and light-fast blue dyes adapted for the rapid dyeing of acrylic textile fibers or of union goods comprising this fiber and wool or regenerated cellulose. Additional objects and achievements of this invention, will appear as the description proceeds.

The problem of dyeing polyacrylonitrile fiber (e. g. the fiber known under the trade name "Orlon"), has been particularly vexing to textile manufacturers interested in using this fiber. It is well known that most dyes produce but weak dyeings upon polyacrylonitrile fiber, and that some of those that can be successfully applied suffer from weak fastness properties. Particularly wanting was a good dye giving on acrylic fiber a dyeing of blue shade, fast to light.

Now according to this invention, novel compounds satisfying the above requirements are obtained by synthesizing 3,7-diamino-phenoxazine compounds possessing in one of the amino groups one or two 2-cyanoethyl radicals.

It will be noted at this point that the synthesis of 3,7-diamino-phenoxazine dyes by reacting together a p-nitroso-dialkyl aniline with a meta dialkylaminophenol is per se well known. My invention differs from this old process principally in selecting a tertiary para-nitroso-aniline wherein the basic N-atom carries at least one 2-cyanoethyl group. In other words, my invention embraces novel compounds of the formula

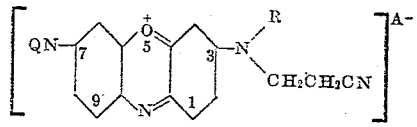

wherein QN represents the radical of a primary or secondary aliphatic amine having not more than 8 C-atoms, for instance the radical of a lower monoalkyl amine (methyl, ethyl, propyl or butyl), a lower dialkyl amine, piperidine or morpholine; R represents a lower alkyl radical, the 2-hydroxyethyl radical or an additional 2-cyanoethyl radical; A is the anion of a water-soluble acid, for instance hydrochloric, sulfuric, hydrobromic, hydriodic, acetic, p-toluene-sulfonic or phosphoric. By "lower alkyl" hereinabove as well as throughout this specification and claims, I mean an alkyl radical of not over 4 C-atoms.

For the purpose of this invention, the positions in the phenoxazine radical will be numbered as in the formula hereinabove. Accordingly, the novel compounds of this invention may be designated generally as 3,7-diamino-phenoxazonium salts, wherein one of the amino groups carries at least one 2-cyanoethyl radical. Apart from the above choice of a special nitrosoaniline compound as indicated, the synthesis may follow conventional procedure.

The requisite p-nitrosoanilines which carry at least one 2-cyanoethyl radical in the amino group are themselves novel compounds, and may be synthesized by reacting with nitrous acid, in conventional manner, upon the corresponding N-2-cyanoethyl aniline, whose third N-valence is satisfied by methyl, ethyl, propyl, butyl, 2-hydroxyethyl or 2-cyanoethyl. Further details of this synthesis are set forth by way of illustration in Example 1 below.

If A is the anion of a heteropoly acid, for instance phosphotungstic acid, the phenoxazonium compound is insoluble and may be used as a pigment. But the field of greatest practical interest is where A is the anion of a simple acid which does not insolubilize the compound. In those events, the novel compounds of this invention are suitable for dyeing polyacrylonitrile fiber in blue shades, and satisfy the following highly desirable qualifications:

They possess good light fastness, and have good sublimation and wash fastness. They possess good fastness to carbonizing treatments, which is an important property of a dye used in dyeing union fabrics of wool and polyacrylonitrile fibers. The novel dyes are stable to both acid and alkali, thus making them adaptable to one-bath dyeing of unions with a variety of other dyes in the same bath. They do not dye the wool component of union goods. The new dyes have good tinctorial strength and are applicable to the fibers at a conveniently rapid rate.

The blue dyeings obtained show a green flare in artificial light. Since many of the newer blues for acrylic fiber show a red flare, the green flare is desirable to neutralize the undesirable, off-shade flare.

A very special advantage of the new dyes is that they are readily made in pure form. The CN group in my novel compounds gives a more stable nitroso compound, which reacts at temperatures lower than those required when the prior-art nitroso compounds are used, and gives the dye product in a high state of purity.

The above formula represents the dye in its simplest form. But, as in the general case of basic dyestuffs of this type, the dye may be isolated as a complex double salt with inorganic salts, particularly zinc chloride. Such double salts perform in the dye bath in the same manner as the uncompounded dye, and are generally equivalent thereto for all practical purposes.

Without limiting my invention, the following examples are given to illustrate my preferred mode of operation. Parts mentioned are by weight.

Example 1

41 parts of m-diethylamino-phenol and 105 parts of N-methyl-N-2-cyanoethyl-p - nitrosoaniline hydrochloride were added to 225 parts of aqueous 40% acetic acid, and stirred at room temperature for one-half hour. The reaction mixture was heated to 80° C. and agitated at that temperature for 40 minutes. The reaction mass was diluted with 200 parts of water, filtered and the residue was washed with 300 parts of water. Sufficient water was added to the combined filtrates to make a total of 1600 parts and the soluble phenoxazonium chloride was salted out by addition of 400 parts of sodium chloride and 15 parts of zinc chloride. The precipitated zinc double salt of the dye was filtered off and purified by first dissolving it in 2400 parts of water at 25° to 30° C. and filtering the solution through a thin layer of filtercel, then washing the residue with 350 parts of water and treating the combined filtrates with 15 parts of zinc chloride, followed by cooling to 10° C. and addition of 480 parts of sodium chloride. The copper-colored crystals of the dye were filtered off and dried in vacuum at 60° C. The product, which is the zinc chloride complex of 3-(N-methyl-N-2-cyanoethyl) amino - 7-diethylaminophenoxazonium chloride, is obtained in good yield. It contains one $ZnCl_2$ molecule for each two molecules of the dye. It dissolves readily in water and dyes "Orlon" acrylic fiber in bright blue, light-fast shade from a hot aqueous dye bath.

The p-nitrosoaniline compound employed as initial material in the above example was prepared as follows:

To a solution of 160 parts of N-methyl-N-2-cyanoethyl aniline in 304 parts of water and 387 parts of 37% hydrochloric acid was added a solution of 69 parts of sodium nitrite in 170 parts of water during 7 hours at a temperature of 0° to 5° C. 280 parts of sodium chloride were added and the reaction mixture was stirred for an additional 16 hours at 0° to 5° C. The reaction product was filtered off, washed with 150 parts of a saturated salt solution and air dried.

*Example 2*

The procedure of Example 1 was repeated, except that in synthesizing the intermediate nitroso compound, the 160 parts of N-methyl-N-2-cyanoethyl aniline were replaced by 174 parts of N-ethyl-N-2-cyanoethyl aniline. 112 parts of this product were then condensed with 41 parts of m-diethylamino-phenol.

The dye ultimately obtained is 3-(N-ethyl-N-2-cyanoethyl)amino-7-diethylamino-phenoxazonium chloride, and can be isolated as such or in the form of ZnCl₂ complex. Its solubility and dyeing qualities are similar to those of the product of Example 1, except that its dyeing shade is slightly greener than that of the product of Example 1.

In a similar manner, by varying the second N-substituent in the initial N-2-cyanoethyl-aniline employed for preparing the nitroso intermediate, and by compensating preferably for the differences in the molecular weights of the materials employed, but following otherwise the procedure of Example 1, other intermediates and dyes may be obtained, the latter being isolated as such or in the form of zinc chloride double salts, wherein the proportion of zinc chloride may be varied from 0, through fractional values, to 1 per mole of the dye. In the following examples, some of the compounds thus obtained are described, giving in sequence (*a*) the initial aniline compound, (*b*) the intermediate obtained, (*c*) the final dye, and (*d*) the shade of the dyeing produced by the dye.

*Example 3*

(*a*) N,N-bis-(2-cyanoethyl)-aniline.
(*b*) N,N-bis-(2-cyanoethyl)-p-nitrosoaniline.
(*c*) 3-(N,N-bis-2 - cyanoethyl)amino-7 - diethylamino-phenoxazonium chloride.
(*d*) Blue, redder than product of Example 1.

*Example 4*

(*a*) N-n-butyl-N-2-cyanoethyl aniline.
(*b*) N-n-butyl-N-2-cyanoethyl-p-nitrosoaniline.
(*c*) 3-(N-butyl-N-2-cyanoethyl)-amino-7 - diethylamino-phenoxazonium chloride.
(*d*) Blue, greener than product of Example 1.

*Example 5*

(*a*) N-2-hydroxyethyl-N-2-cyanoethyl aniline.
(*b*) N-2-hydroxyethyl-N-2-cyanoethyl-p-nitrosoaniline.
(*c*) 3-(N-2-hydroxyethyl-N - 2 - cyanoethyl) - amino - 7 - diethylamino-phenoxazonium chloride.
(*d*) Blue, similar to product of Example 1.

*Example 6*

The procedure of Example 1 was repeated, except that in lieu of 41 parts of m-diethylamino-phenol, an equivalent amount of m-dimethylamino-phenol was employed. The resulting dye, which was 3-(N-methyl-N-2-cyanoethyl)amino - 7 - dimethylamino-phenoxazonium chloride, dyed "Orlon" acrylic fiber a redder shade of blue than the product of Example 1.

In similar manner, by replacing the phenol compound in Example 1 by equivalent amounts of the substituted m-amino-phenols listed below, dyes of related structure were obtained which dyed polyacrylonitrile fiber in blue shades, more or less close to the shade of the product of Example 1.

*Example 7* m-Methylamino phenol.

*Example 8* m-Ethylamino phenol.

*Example 9* m-Di-n-propylamino phenol.

*Example 10* m-Di-n-butylamino phenol.

*Example 11* m-4-morpholinyl phenol.

*Example 12* m-1-piperidyl phenol.

The aminophenols were obtained by condensing the various primary and secondary amines with resorcinol by known methods.

In all cases above, the products were isolated variously as such or in the from of zinc chloride complexes of zinc content varying from 0, through fractions, to 1, it having been observed that the magnitude of the ZnCl₂ content is not material. Where no ZnCl₂ at all was desired in the product, this was achieved simply by omitting the treatment with zinc chloride solution in Example 1.

Instead of preparing and isolating the color as chloride, it may be prepared and isolated as the salt of any other acid. This is achieved simply by replacing the acid in the nitroso compound and the salt employed in the isolation step, by the respective acid and salt of the anion desired. Any anion will do for this purpose, but anions of water-soluble acids are preferred, for instance the ion of sulfuric acid, phosphoric acid or alkali-metal salts of these acids; the chloride, bromide or iodide ion; the ion of acetic acid, p-toluene-sulfonic acid and the like.

The majority of the novel compounds of this invention are water soluble and may be applied to the polyacrylonitrile fibers in water solutions, preferably at or near the boil. No additions to the dye bath are necessary, although nonionic surface active agents may be employed when desired. The dye bath may be neutral, acid or alkaline, and this characteristic permits the dyeing of these colors on mixed goods containing wool or cellulosic fibers in conjunction with the polyacrylonitrile fibers. On dyeing such mixed goods containing wool, the synthetic fiber is dyed without any significant staining of the wool when the dyeing is carried out in a slightly acid bath. The water-soluble aliphatic acids may be employed in such dye baths together with nonionic surface active agents. Union fabrics of viscose and polyacrylonitrile fibers may be dyed from weakly acid, neutral or alkaline baths, in which case the viscose is not significantly stained.

I claim as my invention:

1. A compound of the formula

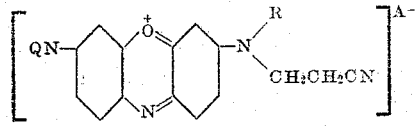

wherein QN represents a radical of the group consisting of lower monoalkylamino, lower dialkylamino, morpholino and piperidino, R is a substituent of the group consisting of lower alkyl, 2-hydroxyethyl and 2-cyanoethyl; A is the anion of a water-soluble acid, and wherein said lower alkyl radicals contain not more than 4 C-atoms each.

2. 3 - (N - methyl - N - 2 - cyanoethyl)amino - 7 - diethylamino-phenoxazonium chloride.

3. 3 - (N - ethyl - N - 2 - cyanoethyl)amino - 7 - diethylamino-phenoxazonium chloride.

4. 3 - (N - methyl - N - 2 - cyanoethyl)amino - 7 - dimethylamino-phenoxazonium chloride.

5. A p-nitrosoaniline compound of the formula

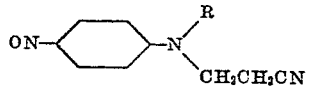

wherein R is a substituent of the group consisting of 2-hydroxyethyl, 2-cyanoethyl and alkyl of not more than 4 C-atoms.

6. N - methyl - N - 2 - cyanoethyl - p - nitrosoaniline.
7. N,N - di(2 - cyanoethyl) - p - nitrosoaniline.

References Cited in the file of this patent

UNITED STATES PATENTS

| | | |
|---|---|---|
| 1,766,403 | Schulemann et al. | June 24, 1930 |
| 1,879,541 | Schulemann et al. | Sept. 27, 1932 |